United States Patent
Geshi et al.

(10) Patent No.: US 8,399,121 B2
(45) Date of Patent: Mar. 19, 2013

(54) BATTERY STRUCTURE

(75) Inventors: Shinya Geshi, Kanagawa (JP); Yasunori Uchida, Kanagawa (JP); Masahiko Katou, Kanagawa (JP); Shintaro Shimizu, Kanagawa (JP); Fuminori Ozaki, Kanagawa (JP)

(73) Assignee: Panasonic Corporation, Osaka (JP)

( * ) Notice: Subject to any disclaimer, the term of this patent is extended or adjusted under 35 U.S.C. 154(b) by 603 days.

(21) Appl. No.: 12/600,956

(22) PCT Filed: Jun. 4, 2008

(86) PCT No.: PCT/JP2008/001406
§ 371 (c)(1),
(2), (4) Date: Nov. 19, 2009

(87) PCT Pub. No.: WO2008/149546
PCT Pub. Date: Dec. 11, 2008

(65) Prior Publication Data
US 2010/0167094 A1  Jul. 1, 2010

(30) Foreign Application Priority Data

Jun. 6, 2007 (JP) ................................. 2007-150206
Dec. 25, 2007 (JP) ................................. 2007-332076

(51) Int. Cl.
*H01M 2/24* (2006.01)
(52) U.S. Cl. .......................... 429/160; 429/158; 429/159
(58) Field of Classification Search .................... 429/160
See application file for complete search history.

(56) References Cited

U.S. PATENT DOCUMENTS

| 6,186,809 | B1 * | 2/2001 | Kung | 439/248 |
| 7,329,158 | B1 * | 2/2008 | Roberts et al. | 439/851 |
| 2008/0088190 | A1 * | 4/2008 | Ideshio | 310/71 |
| 2009/0123830 | A1 * | 5/2009 | Kato et al. | 429/160 |

FOREIGN PATENT DOCUMENTS

| JP | 11040121 A | * | 2/1999 |
| JP | 2000-077052 | | 3/2000 |
| JP | 2002-246006 | | 8/2002 |
| JP | 2006-261083 | | 9/2006 |
| WO | WO 2007/004335 A1 | | 1/2007 |

* cited by examiner

*Primary Examiner* — Patrick Ryan
*Assistant Examiner* — Lucas J O Donnell
(74) *Attorney, Agent, or Firm* — McDermott Will & Emery LLP (57) ABSTRACT

This invention relates to a battery structure with improved safety. The battery structure includes: at least two batteries disposed axially parallel to each other, positive terminals thereof facing opposite directions, negative terminals thereof facing opposite directions; an insulating material covering each of the batteries; and a connecting member provided at an end of the at least two batteries for connecting the positive terminal of one of the batteries with the negative terminal of the other battery. The connecting member includes: a negative terminal connector attached to the other battery so as to come into contact with the negative terminal of the other battery; and a bus bar connected at one end portion thereof to the positive terminal of the one battery. The negative terminal connector has a socket into which the other end portion of the bus bar is to be inserted. The tip of the other end portion of the bus bar in the direction of insertion into the socket is chamfered so that it does not impair the insulating material.

7 Claims, 7 Drawing Sheets

BATTERY STRUCTURE

RELATED APPLICATIONS

This application is the U.S. National Phase under 35 U.S.C. §371 of International Application No. PCT/JP2008/001406, filed on Jun. 4, 2008, which in turn claims the benefit of Japanese Application Nos. 2007-150206, filed on Jun. 6, 2007 and 2007-332076, filed on Dec. 25, 2007, the disclosures of which Applications are incorporated by reference herein.

TECHNICAL FIELD

The invention relates to a battery structure, and more particularly, to a technique for improving the safety, workability, and reliability of a battery structure composed of at least two batteries covered with an insulating material.

BACKGROUND ART

Recently, electronic devices such as AV equipment, personal computers, and portable communications devices have been rapidly becoming cordless and more portable. As the power source for these electronic devices, alkaline storage batteries such as nickel-cadmium storage batteries and nickel-metal hydride storage batteries, and lithium ion secondary batteries are mainly used, since their reliability is high and their maintenance is easy. Also, these batteries are widely used in various other applications. In particular, they are increasingly used as the power source for electric assist bicycles, lawn mowers, electric vehicles, and the like, which require good characteristics at a large electrical load. Batteries for use as the power source for such devices are required to provide further large-current charge/discharge characteristics and safety, and the development of batteries meeting such requirements is necessary.

A common method for satisfying such requirements is to connect such batteries to form a battery pack or battery structure having good large-current discharge characteristics, so that such a battery pack or battery structure is used as the power source in the above-mentioned applications.

Figure 11:
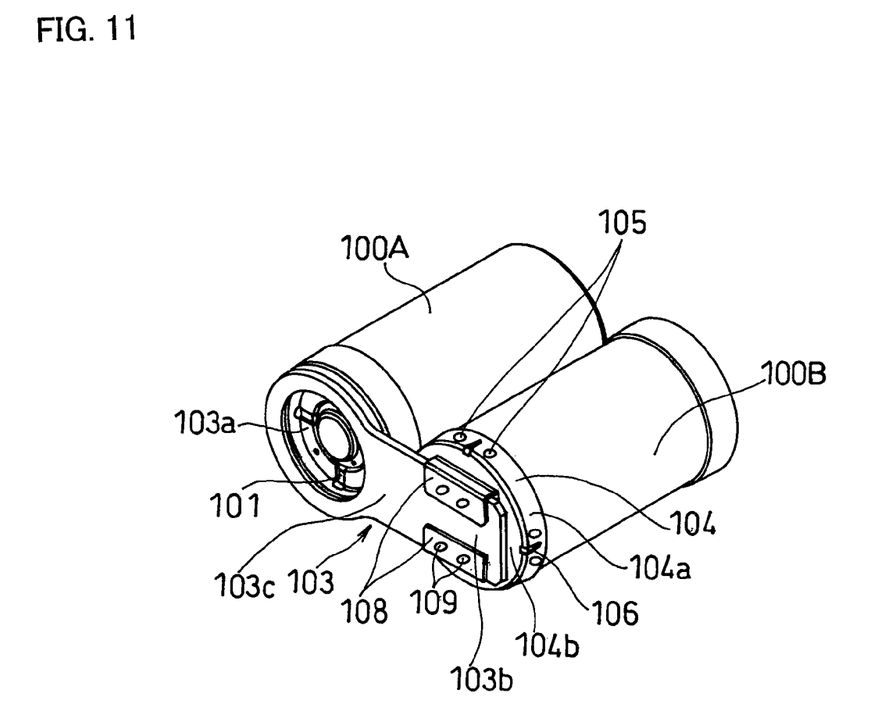
FIG. 11 is a perspective view of an exemplary conventional battery structure.

FIG. 11 illustrates an exemplary conventional battery structure. The battery structure of FIG. 11 is composed of two batteries 100A and 100B (cylindrical alkaline storage batteries), and the positive terminal of the battery 100A is connected to the negative terminal of the battery 100B by a bus bar 103.

The bus bar 103 is a substantially flat plate having a thin welded portion 103a at one end and a thick connecting portion 103b at the other end. The welded portion 103a is welded to a seal member 101 (positive terminal) of the battery 100A, while the connecting portion 103b is connected to the battery case bottom (negative terminal) of the battery 100B. The welded portion 103a is connected to the connecting portion 103b by a middle portion 103c, which is disposed between the welded portion 103a and the connecting portion 103b and has the same thickness as that of the connecting portion 103b. Also, the connecting portion 103b of the bus bar 103 is connected to the battery case bottom of the battery 100B by means of a negative terminal connector 104.

The negative terminal connector 104 is a thin, dish-shaped member having: a cylindrical portion 104a fitting to the outer face of the battery case bottom of the battery 100A; and a substantially circular flat plate 104b disposed so as to close one opening end of the cylindrical portion 104a. The flat plate 104b has an inner face facing the outer face of the battery case bottom, and an outer face opposite thereto. The negative terminal connector 104 is resistance welded to the outer face of the battery case bottom at welding spots 105 positioned on the wall of the cylindrical portion 104a. In FIG. 11, notches 106 between the welding spots 105 are provided to suppress idle current in welding.

The flat plate 104b of the negative terminal connector 104 has a pair of holders 108, which holds the connecting portion 103b of the bus bar 103 so as to join the negative terminal connector 104 and the bus bar 103. The holders 108 are formed by slitting and pressing the flat plate 104b of the negative terminal connector 104 so that the cross-section is L shaped. The connecting portion 103b is inserted between the pair of holders 108 and, in this state, the connecting portion 103b is welded to the holders 108 at welding spots 109 to join the bus bar 103 and the negative terminal connector 104. In this way, the electrodes of different polarities of the battery 100A and the battery 100B are connected (e.g., see Patent Document 1).

Patent Document 1: Japanese Laid-Open Patent Publication No. 2006-261083

DISCLOSURE OF THE INVENTION

Problem to be Solved by the Invention

When using a battery structure composed of a plurality of batteries and having large-current and high-voltage characteristics as the power source for an electric vehicle or the like, it is necessary to give sufficient consideration to insulation of the battery structure from the outside.

Figure 12:
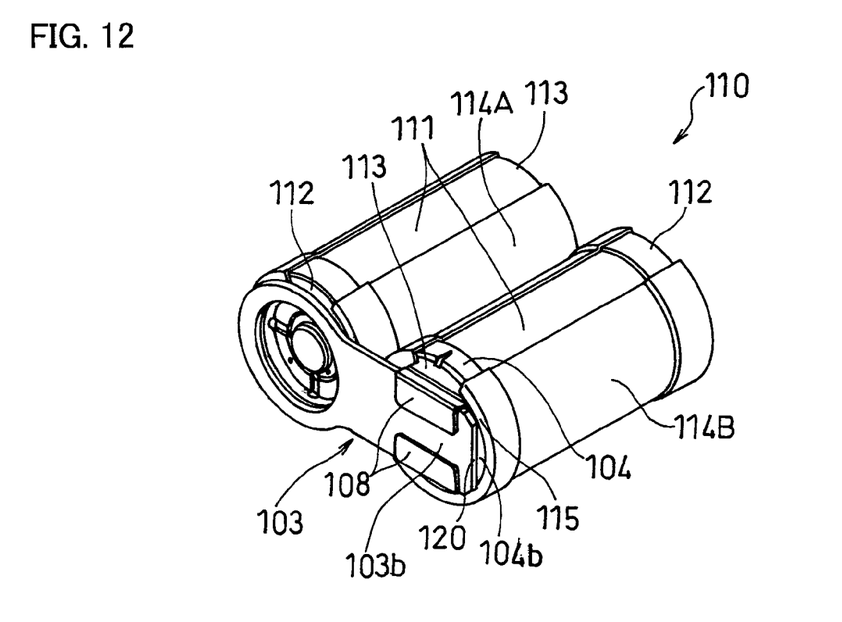
FIG. 12 is a perspective view of the battery structure of FIG. 11 covered with outer insulating tubes.

FIG. 12 is a perspective view of the battery structure each battery of which is covered with an outer insulating tube serving as an insulating material. It should be noted that FIG. 12 illustrates the outer insulating tube a part of which is removed so that the inside of the tube can be seen.

As illustrated in FIG. 12, a battery structure 110 is covered with heat-shrinkable outer insulating tubes 114A and 114B each comprising a thin resin film, in order to insulate the batteries from the outside and ensure the safety of the battery structure itself. Specifically, an outer side face 111, an upper-side (positive terminal side) outer edge 112, and a bottom-side (negative terminal side) outer edge 113 of each of the batteries forming the battery structure 110 are covered therewith.

As described above, the battery structure is usually covered with outer insulating tubes. However, in the battery structure disclosed in Patent Document 1 (see FIG. 11 and FIG. 12), when the connecting portion 103b is inserted between the holders 108, an outer edge covering portion 115 of the outer insulating tube 114A, 114B covering the battery bottom-side outer edge 113 of the battery structure 110 may be rubbed against a tip 120 of the connecting portion 103b of the bus bar 103, thereby resulting in tear of the outer edge covering portion 115. In the example illustrated in the figure, the outer edge covering portion 115 of the outer insulating tube 114B of the battery 100B, which is located on the front side of the figure, is particularly prone to tear. If the edge shape of the tip 120 of the connecting portion 103b is sharp, the outer edge covering portion 115 of the outer insulating tube 114A, 114B is more prone to tear.

When a part of the outer insulating tube 114A, 114B tears for such a reason, if a temperature shock is exerted to the outer edge covering portion 115 of the outer insulating tube 114A, 114B covering the outer side face 111 of the battery, due to a change in the ambient temperature of the device using the battery structure, or due to heat generated by charge/discharge of the battery, the outer insulating tube 114b may shrink due to heat and the whole outer insulating tube 114A, 114B may tear from the torn part.

The invention is accomplished in view of the above-described problems with conventional art, and an object of the invention is to provide a battery structure that is composed of batteries that are insulated from the outside in a more reliable manner by improving the stability in mounting connecting members for connecting the batteries to form the battery structure.

Means for Solving the Problem

In order to achieve the above object, the battery structure of the invention includes: at least two batteries disposed axially parallel to each other, positive terminals thereof facing opposite directions, negative terminals thereof facing opposite directions; an insulating material covering each of the batteries; and a connecting member provided at an end of the at least two batteries for connecting the positive terminal of one of the batteries with the negative terminal of the other battery. The connecting member includes: a negative terminal connector attached to the other battery so as to come into contact with the negative terminal of the other battery; and a bus bar connected at one end portion thereof to the positive terminal of the one battery. The negative terminal connector has a socket into which the other end portion of the bus bar is to be inserted, and the tip of the other end portion of the bus bar in the direction of insertion into the socket is chamfered.

The socket of the negative terminal connector is preferably prismatic.

Preferably, the negative terminal connector includes: a cylindrical portion fitting to the end portion of the other battery on the negative terminal side; and a flat plate facing the bottom of the other battery on the negative terminal side, and the flat plate has the socket.

Preferably, the other end portion of the bus bar has a step that protrudes toward the flat plate when the other end portion is inserted into the socket.

Preferably, the flat plate of the negative terminal connector has a protrusion to come into contact with the other end portion of the bus bar upon insertion into the socket, and the protrusion is provided at least in front of or behind the socket in the insertion direction.

Preferably, the protrusion is in the shape of a line, dots, or an oval.

Preferably, the other end portion of the bus bar has an insertion-depth defining protrusion to abut against an opening edge of the socket to define the depth of insertion into the socket.

Effect of the Invention

According to the invention, when the other end portion of the bus bar of the battery structure is inserted into the socket of the negative terminal connector, the insertion is facilitated. It is therefore possible to prevent the insulating material from becoming damaged due to the rubbing of the other end portion against the insulating material. This permits more reliable insulation of the batteries of the battery structure from the outside, thereby improving the safety of the battery structure.

BEST MODE FOR CARRYING OUT THE INVENTION

The invention relates to a battery structure including: at least two batteries disposed axially parallel to each other, positive terminals thereof facing opposite directions, negative terminals thereof facing opposite directions; an insulating material covering each of the batteries; and a connecting member provided at an end of the at least two batteries for connecting the positive terminal of one of the batteries with the negative terminal of the other battery. The connecting member includes: a negative terminal connector attached to the other battery so as to come into contact with the negative terminal of the other battery; and a bus bar connected at one end portion thereof to the positive terminal of the one battery. The negative terminal connector has a socket into which the other end portion of the bus bar is to be inserted, and the tip of the other end portion of the bus bar in the direction of insertion into the socket is chamfered. The socket is preferably prismatic.

According to this configuration, since the tip of the other end portion of the bus bar in the direction of insertion into the socket is chamfered, when the other end portion (connecting portion) of the bus bar is inserted into the socket, the danger of damage of the insulating material by the edge of the other end portion is reduced. Therefore, the safety of the battery structure is improved. Also, in a more preferable embodiment, the socket into which the connecting portion is to be inserted is prismatic, so the dimensional stability is improved, compared with the L-shaped holders. Hence, the other end portion (connecting portion) of the bus bar can be stably inserted into the socket of the negative terminal connector. This can prevent the outer insulating tube from tearing due to the rubbing of the insulating material (outer insulating tube) against the connecting portion of the bus bar. As a result, the safety of the battery structure is improved.

Also, in the invention, the negative terminal connector can include: a cylindrical portion fitting to the end portion of the other battery on the negative terminal side; and a flat plate facing the bottom of the other battery on the negative terminal side, and the flat plate can have the socket. Also, the other end portion of the bus bar can have a step that protrudes toward the flat plate when the other end portion is inserted into the socket.

In this case, when the other end portion (connecting portion) of the bus bar is inserted into the socket of the negative terminal connector, the friction resistance is reduced. Therefore, the danger of tear of the insulating material due to the rubbing of the insulating material (outer insulating tube) against the other end portion of the bus bar can be further reduced. At the same time, the insertion of the other end portion of the bus bar into the socket of the negative terminal connector is facilitated.

Also, in the invention, the other end portion of the bus bar can have an insertion-depth defining protrusion to abut against an opening edge of the socket to define the depth of insertion into the socket.

In this case, the insertion depth in inserting the other end portion (connecting portion) of the bus bar into the socket can be easily stabilized. Further, when the other end portion of the bus bar is inserted into the socket of the negative terminal connector, the area of the tip of the other end portion and the insulating material rubbed against each other is limited. It is thus possible to reduce the danger of tear of the insulating material. Also, since the depth of insertion of the other end portion of the bus bar into the socket is stabilized, the distance between the batteries of the battery structure can be easily fixed. Hence, it is also possible to improve the dimensional accuracy of the battery structure.

Also, the flat plate of the negative terminal connector can have a protrusion to come into contact with the other end portion of the bus bar upon insertion into the socket, and the protrusion can be provided at least in front of or behind the socket in the insertion direction. The protrusion can be in the shape of a line, dots, or an oval.

In this case, when the other end portion of the bus bar is inserted into the socket of the negative terminal connector, the other end portion is kept clear of the surface of the flat plate, so the friction resistance is reduced. Hence, smooth insertion is possible without requiring extra force, thereby further reducing the danger of tear of the insulating material due to the rubbing of the insulating material against the other end portion of the bus bar. Also, the insertion of the other end portion of the bus bar into the socket is facilitated.

Also, the protrusion of the bus bar can be in the shape of a line, dots, an oval, or the like.

When the thickness of the other end portion of the bus bar is represented by L1, the internal height of the prismatic socket is represented by L2, and the thickness of the insulating material on the side where the negative terminal connector contacts the bus bar is represented by L3, the relation of these dimensions preferably satisfy the following formula 1:

$$L1+L3 \leq L2 \quad (1)$$

Setting the relation of the dimensions as in the above inequality 1 further reduces the possibility that the insulating material (outer insulating tube) is rubbed against the end portion (connecting portion) of the bus bar, thereby permitting more reliable prevention of tear of the outer insulating tube.

Embodiment 1

Figure 1:
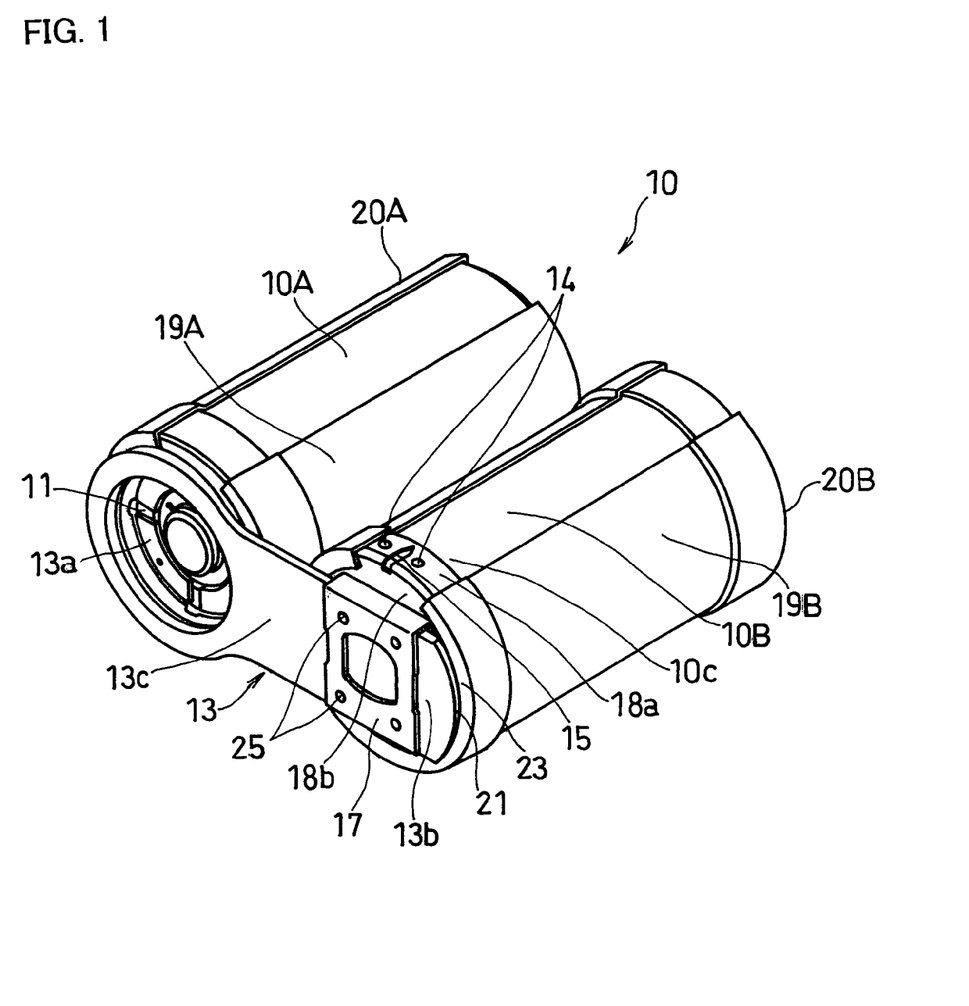
FIG. 1 is a perspective view schematically showing the structure of a battery structure according to Embodiment 1 of the invention.
Figure 2:
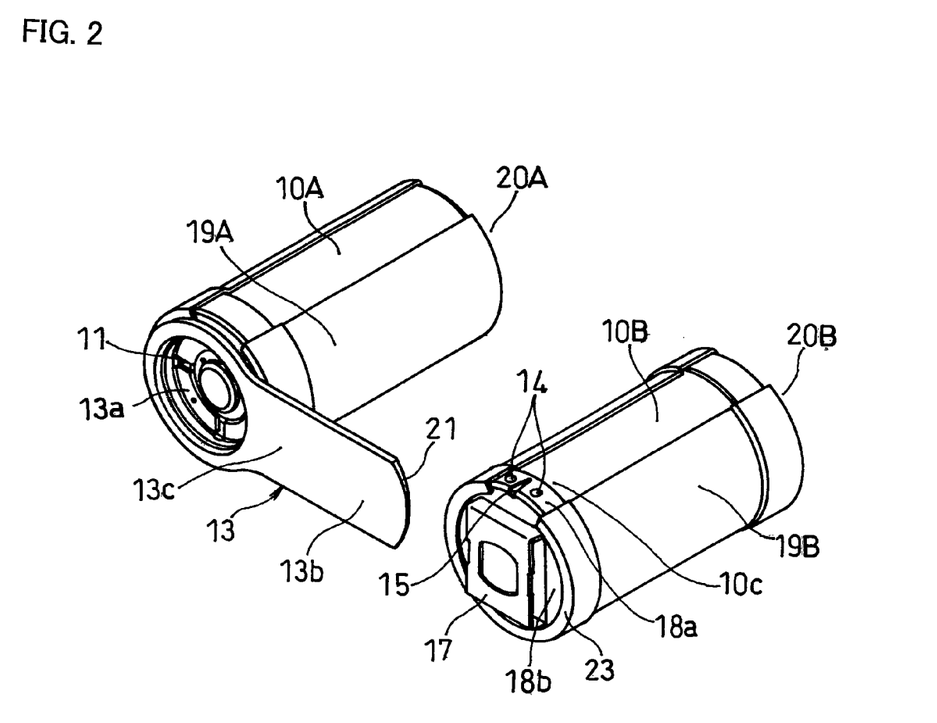
FIG. 2 is an exploded perspective view of the battery structure.
Figure 3:
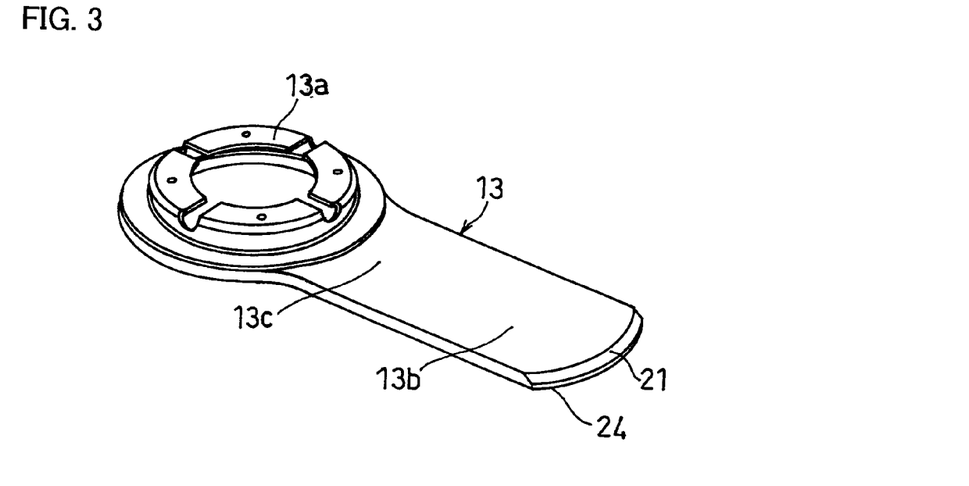
FIG. 3 is a perspective view of a bus bar included in the battery structure.
Figure 4:
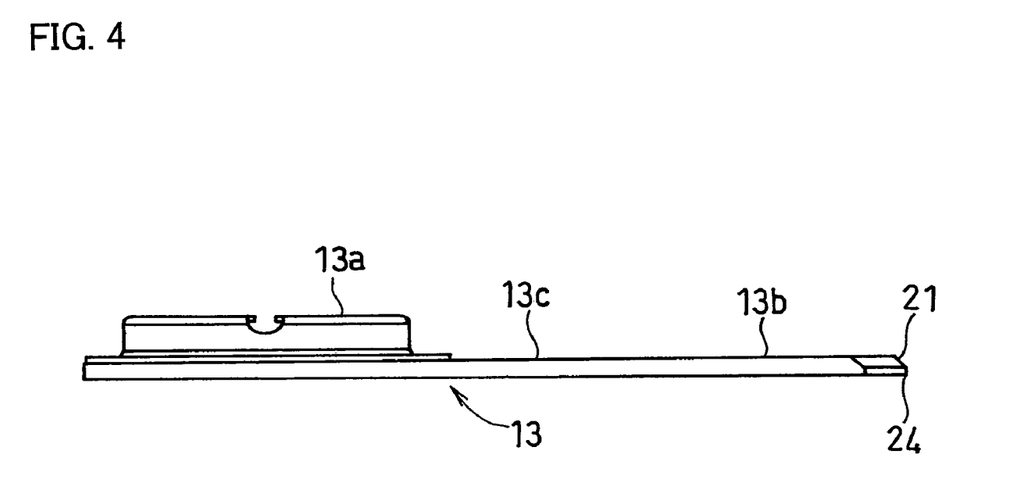
FIG. 4 is a side view of the bus bar.

Referring to drawings, embodiments of the invention are hereinafter described. FIG. 1 is a perspective view schematically showing the structure of a battery structure in Embodiment 1 of the invention, and FIG. 2 is an exploded perspective view thereof. FIG. 3 is a perspective view of a bus bar, and FIG. 4 is a side view thereof. Also, FIG. 5 is a perspective view showing the internal structure of a battery forming the battery structure.

Figure 5:
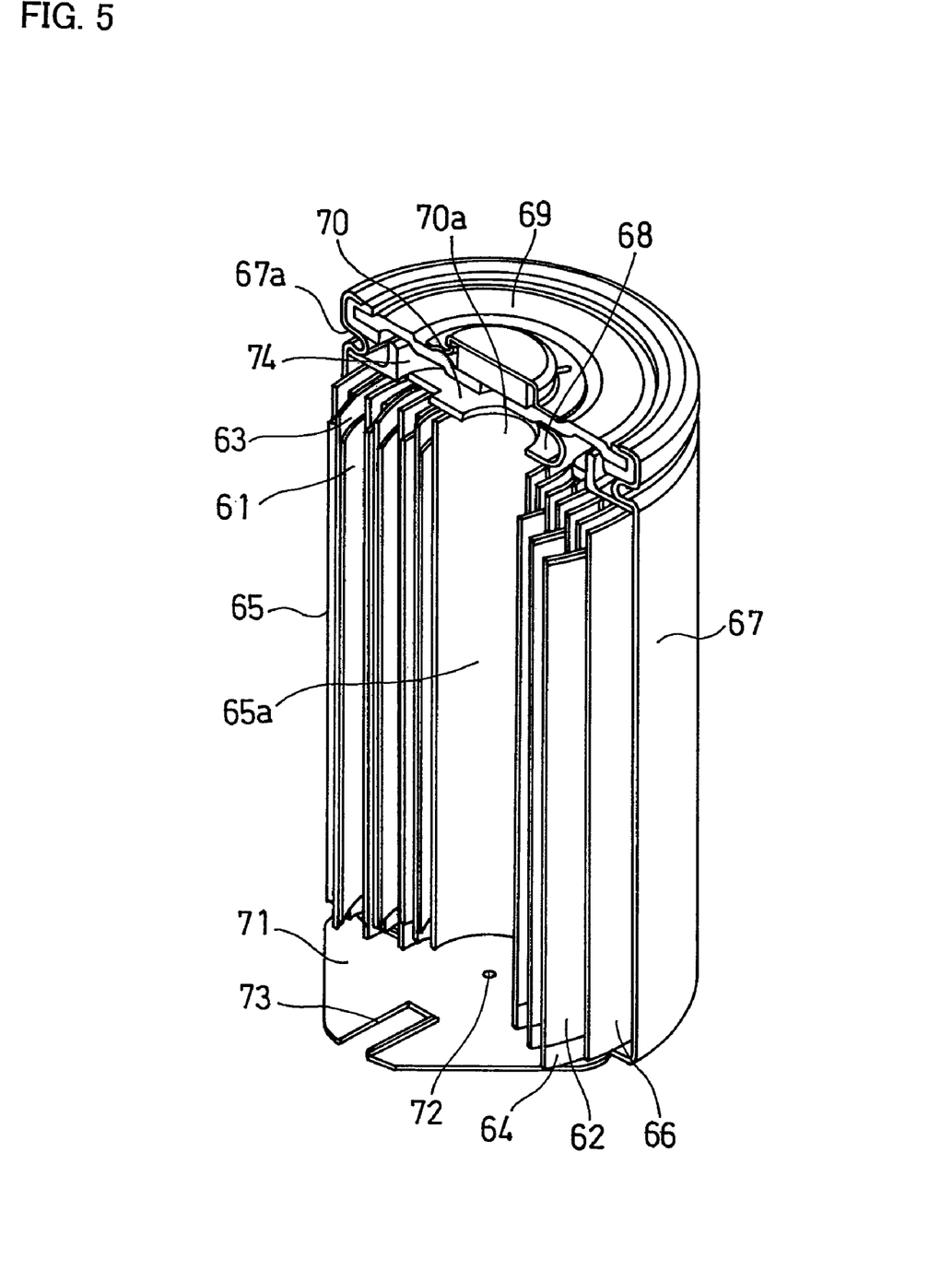
FIG. 5 is a perspective view showing the internal structure of a battery forming the battery structure.

As illustrated in FIG. 5, a battery forming a battery structure 10 includes a positive electrode plate 61 that comprises a strip-like positive electrode core member 63 and positive electrode active material layers formed on both sides thereof. The strip-like positive electrode core member 63 is exposed at one end in the width direction. The battery also includes a negative electrode plate 62 that comprises a strip-like negative electrode core member 64 and negative electrode active material layers formed on both sides thereof. The strip-like negative electrode core member 64 is exposed at one end in the width direction thereof. The positive electrode plate 61, the negative electrode plate 62, and a separator 66 interposed therebetween are spirally wound to form an electrode plate assembly 65 having a hollow 65a. The electrode plate assembly 65, an upper current collector 70, a lower current collector 71, a connection lead 68, and the like are housed in a battery case 67.

The exposed part of the negative electrode core member 64 protrudes downward from the electrode plate assembly 65 (protrudes toward the bottom side of the battery case 67), and the exposed part is welded to the lower current collector 71 at a connecting portion 73. The connecting portion 73 is formed by making a rectangular hole in the lower current collector 71 and applying a burring process to the pair of opposing longer sides of the rectangular hole. On the other hand, the exposed part of the positive electrode core member 63 protrudes upward from the electrode plate assembly 65 (protrudes toward a seal member 69 which will be described below), and the exposed part is welded to the upper current collector 70 at a plurality of locations. Further, the upper current collector 70 is connected to the seal member 69 via the connection lead 68. Also, the lower current collector 71 is resistance welded to the inner face of bottom of the battery case 67 at a welding spot 72 by inserting a welding electrode rod into a central hole 70a of the upper current collector 70 and the hollow 65a of the electrode plate assembly 65, and sandwiching the lower current collector 71 and the bottom wall of the battery case 67 under pressure between the welding electrode rod and a welding electrode disposed so as to contact the outer face of bottom of the battery case 67.

Also, a ring-like insulator plate 74 is disposed over the circumference of the upper current collector 70, i.e., between the upper current collector 70 and the seal member 69, in order to prevent an internal short-circuit between the upper current collector 70 serving as the positive electrode current collector and the battery case 67 serving as the negative terminal. Formed near the upper open edge of the battery case 67 is an annular recess 67a, which extends in the circumferential direction of the battery case 67. The electrode plate assembly 65 is pressed downward by the lower side (battery case 67 bottom side) portion of the wall of the battery case 67 defining the recess 67a, with the insulator plate 74 therebetween. As a result, the electrode plate assembly 65 is secured at a fixed position inside the battery case 67.

Also, a predetermined amount of an alkaline electrolyte is injected into the battery case 67 from the hole 70a of the upper current collector 70. The seal member 69 including a positive electrode external terminal is mounted on the upper side (battery case 67 opening side) portion of the wall of the battery case 67 defining the recess 67a. At this time, in order to interconnect the seal member 69 and the upper current collector 70, the folded connection lead 68 is inserted between the seal member 69 and the electrode plate assembly 65. In this state, the open edge of the battery case 67 is crimped inward so as to sandwich the seal member 69 between the open edge of the battery case 67 and the upper side portion of the wall of the battery case 67 defining the recess 67a, thereby sealing the battery case 67. In this way, the cylindrical alkaline storage battery is formed.

Next, the battery structure 10 comprising the above-described cylindrical alkaline storage batteries connected to each other is described.

As illustrated in FIG. 1 and FIG. 2, the battery structure 10 is composed of at least two batteries each of which is covered with an insulating material. The positive terminal and the negative terminal of the covered batteries are connected to each other by a connecting means including a bus bar 13. In the example illustrated in the figure, the number of batteries is two, and each of batteries 10A and 10B is a cylindrical alkaline storage battery. Also, as the insulating material, specifically, heat-shrinkable outer insulating tubes 19A and 19B each comprising a thin resin film are used. The outer insulating tubes 19A and 19B cover the outer side faces, upper side (positive terminal side) outer edges, and bottom side (negative terminal side) outer edges of the batteries 10A and 10B.

In FIG. 1 and FIG. 2, a part of each of the outer insulating tubes 19A and 19B is removed so that the inside of the tube can be seen; however, in fact, the outer side faces, upper-side outer edges, and bottom-side outer edges of the batteries 10A and 10B are totally covered with the outer insulating tubes 19A and 19B, respectively.

As illustrated in FIGS. 1 to 4, the bus bar 13 is a substantially flat plate having a welded portion (one end portion) 13a at one end and a connecting portion (the other end portion) 13b at the other end. The welded portion 13a is welded to a seal member 11 (positive terminal) of the battery 10A, while the connecting portion 13b is connected to the battery case bottom (negative terminal) of the battery 10B by means of a negative terminal connector 18. The welded portion 13a is connected to the connecting portion 13b by a middle portion 13c, which is disposed between the thin welded portion 13a and the thick connecting portion 13b and has the same thickness as that of the connecting portion 13b.

As illustrated in FIG. 2, the battery 10A is independently covered with the outer insulating tube 19A, and the welded portion 13a of the bus bar 13 is welded to the seal member 11 of the battery 10A to form a battery 20A with the bus bar.

The negative terminal connector 18 is a thin dish-shaped member having: a cylindrical portion 18a fitting to the outer face of the battery case bottom of the battery 10A; and a substantially circular flat plate 18b formed so as to close one opening end of the cylindrical portion 18a. The flat plate 18b has an inner face facing the battery case bottom, and an outer face opposite thereto. The negative terminal connector 18 is resistance welded to the outer face of the battery case bottom at welding spots 14 positioned on the wall of the cylindrical portion 18a. In FIGS. 1 and 2, notches 15 between the welding spots 14 are provided to suppress idle current in welding.

The flat plate 18b of the negative terminal connector 18 has, on the outer face, a prismatic socket 17 into which the connecting portion 13b of the bus bar 13 is to be inserted to join the negative terminal connector 18 and the bus bar 13. In terms of the production cost of the negative terminal connector 18, it is preferable to form the socket 17 by slitting and pressing the flat plate 8b. Also, in terms of dimensional accuracy, it is preferable to form the socket 17 by bonding a sectionally U-shaped member with a bonding margin to the outer face of the flat plate 18b. Also, the negative terminal connector 18 is mounted on the battery case bottom of the battery 10B by fitting the cylindrical portion 18a to an outer face 10c of the battery case bottom of the battery 10B and, in this state, welding the cylindrical portion 18a to the outer face 10c of the battery case bottom at the welding spots 14. The battery 10B and the negative terminal connector 18 are covered with the outer insulating tube 19B, to form a battery 20B with the negative terminal connector.

Further, in assembling the battery 20A with the bus bar and the battery 20B with the negative terminal connector, the connecting portion 13b is inserted into a predetermined position of the socket 17 and, in this state, the connecting portion 13b is welded to the socket 17 at welding spots 25. In this way, the battery 20A with the bus bar and the battery 20B with the negative terminal connector are combined to form a battery structure.

As illustrated in FIG. 3 and FIG. 4, the bus bar 13 has a tip 24 in the direction in which the connecting portion 13b is inserted into the socket 17 of the negative terminal connector 18, and the tip 24 has a chamfer 21. The chamfer 21 is formed by rounding the edge of the tip 24 of the connecting portion 13b of the bus bar 13 facing the flat plate 18b of the negative terminal connector 18. Therefore, when the connecting portion 13b is inserted into the socket 17 of the negative terminal connector 18, even if the tip 24 is rubbed against an outer edge covering portion 23 of the outer insulating tube 19B covering the outer edge of the negative terminal connector 18, it is possible to prevent the outer edge covering portion 23 from tearing. This can improve the safety of the battery structure. The chamfer 21 is preferably formed by R process (rounding).

Also, since the socket 17 has a prismatic shape, it is possible to increase the accuracy of the internal dimension of the socket 17 in the height direction (axial direction of the battery 10B), i.e., the dimension corresponding to the thickness of the connecting portion 13b of the bus bar 13. As a result, it is possible to prevent the internal dimension of the socket 17 in the height direction from becoming too small, and hence, when the connecting portion 13b is inserted into the socket 17, it is possible to prevent the tip 24 of the connecting portion 13b from being strongly rubbed against the outer edge covering portion 23 of the outer insulating tube 19B. This allows more reliable prevention of tear of the outer edge covering portion 23 than when the socket is composed of, for example, a pair of sectionally L-shaped holders (see FIGS. 11 and 12).

When the internal height of the socket 17 is represented by L1, the thickness of the connecting portion 13b is represented by L2, and the thickness of the outer edge covering portion 23 of the outer insulating tube 19B is represented by L3, it is preferable to form a socket 17A and a bus bar 13G so that the relation of L1, L2, and L3 satisfy the inequality 1:

$$L1+L3 \leq L2 \qquad (1)$$

Setting the dimensions of the respective components as described above permits more reliable prevention of tear of the outer insulating tube 19B due to the rubbing of the tip 24 of the connecting portion 13b against the outer edge covering portion 23 of the outer insulating tube 19B.

In Embodiment 1, the socket 17 has been described as having a prismatic shape, but this is not to be construed as limiting. The invention can be advantageously applied to the structure as illustrated in FIG. 11 and FIG. 12 in which the socket is composed of two sectionally L-shaped holders 108. In this case, providing the tip 24 of the connecting portion 13b with the chamfer 21 can also reduce the danger of tear of the outer edge covering portion 23 due to the rubbing of the tip 24 of the connecting portion 13b against the outer edge covering portion 23 of the outer insulating tube 19B.

Embodiment 2

Embodiment 2 of the invention is described below. Embodiment 2 is an alteration of Embodiment 1. In the following description, only the components different from those of Embodiment 1 are described, and the same components as those of Embodiment 1 are given the same reference characters with their description omitted.

Figure 6:
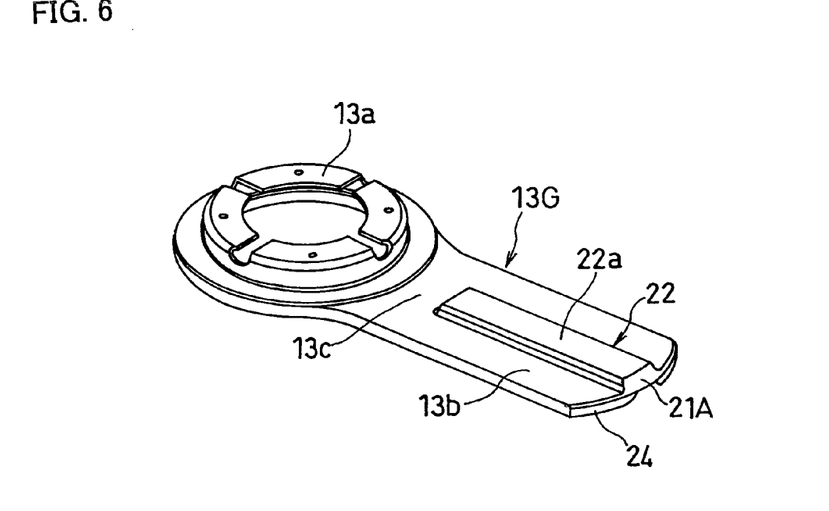
FIG. 6 is a perspective view of a bus bar included in a battery structure according to Embodiment 2 of the invention.
Figure 7:
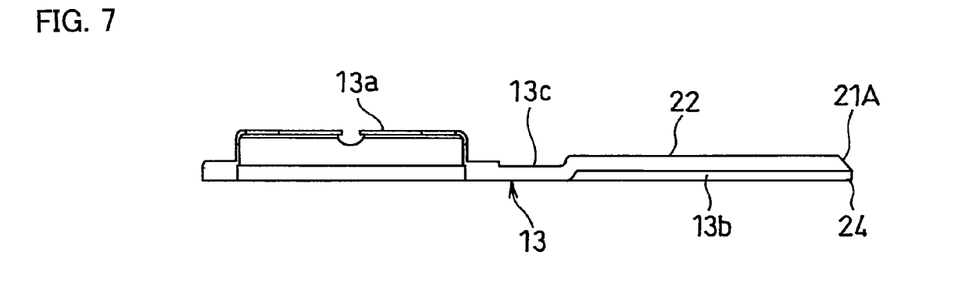
FIG. 7 is a side view of the bus bar.

In Embodiment 2, as illustrated in FIG. 6 and FIG. 7, a bus bar 13G has a step 22, which is formed on the face of the connecting portion 13b facing the flat plate 18b of the negative terminal connector 18. The step 22 is formed in the central part of the connecting portion 13b in the width direction thereof so as to extend linearly from the tip 24 of the bus bar 13G to the middle portion 13c in the longitudinal direction of the bus bar 13G. Also, the step 22 has a substantially uniform height, and has a flat top face 22a.

As described above, the step 22 having the flat top face 22a is formed on the face of the connecting portion 13b of the bus bar 13G facing the flat plate 18b of the negative terminal connector 18. As a result, the contact area of the connecting portion 13b and the flat plate 18b decreases, thereby reducing the friction resistance in inserting the connecting portion 13b into the socket 17. Hence, the insertion of the connecting portion 13b into the socket 17 is facilitated. There is thus no need to apply extra force when inserting the connecting portion 13b into the socket 17. Even if the tip 24 of the connecting portion 13b is rubbed against the outer edge covering portion 23 of the outer insulating tube 19B, they are not strongly rubbed against each other with extra force. It is therefore possible to prevent the outer insulating tube 19B from tearing in a more reliable manner.

A chamfer 21A of the tip 24 of the connecting portion 13b is formed by rounding the edge of the tip 24 facing the flat plate 18b of the negative terminal connector 18 and the end face of the step 22. Also, the step 22 is preferably formed by an extruding process.

Figure 8:
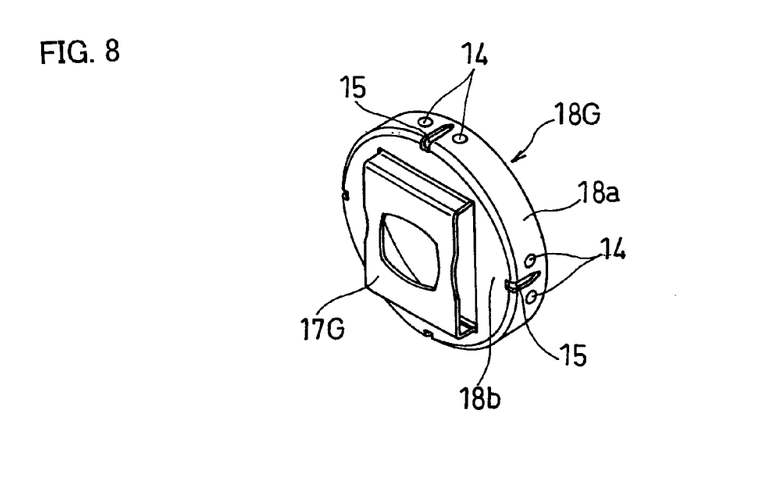
FIG. 8 is a perspective view of a negative terminal connector included in the battery structure.

Also, in Embodiment 2, as illustrated in FIG. 8, a socket 17G of a negative terminal connector 18G has a prismatic shape. When the internal height of the socket 17G is represented by L11, the thickness of the connecting portion 13b including the step 22 is represented by L12, and the thickness of the outer edge covering portion 23 of the outer insulating tube 19B is represented by L13, it is preferable to form the socket 17A and the bus bar 13G so that the relation of L11, L12, and L13 satisfy the inequality 1:

$$L11+L13 \leq L12 \tag{1}$$

Setting the dimensions of the respective components as described above permits more reliable prevention of tear of the outer insulating tube 19B due to the rubbing of the tip 24 of the connecting portion 13b against the outer edge covering portion 23 of the outer insulating tube 19B.

In Embodiment 2, the socket 17G has been described as having a prismatic shape, but this is not to be construed as limiting. The invention can be advantageously applied to the structure as illustrated in FIG. 11 and FIG. 12 in which the socket is composed of two sectionally L-shaped holders 108. In this case, by providing the connecting portion 13b with the step 22, the insertion of the connecting portion 13b into the socket 17 is facilitated. This can reduce the danger of tear of the outer edge covering portion 23 due to the rubbing of the tip 24 of the connecting portion 13b against the outer edge covering portion 23 of the outer insulating tube 19B.

Embodiment 3

Figure 9:
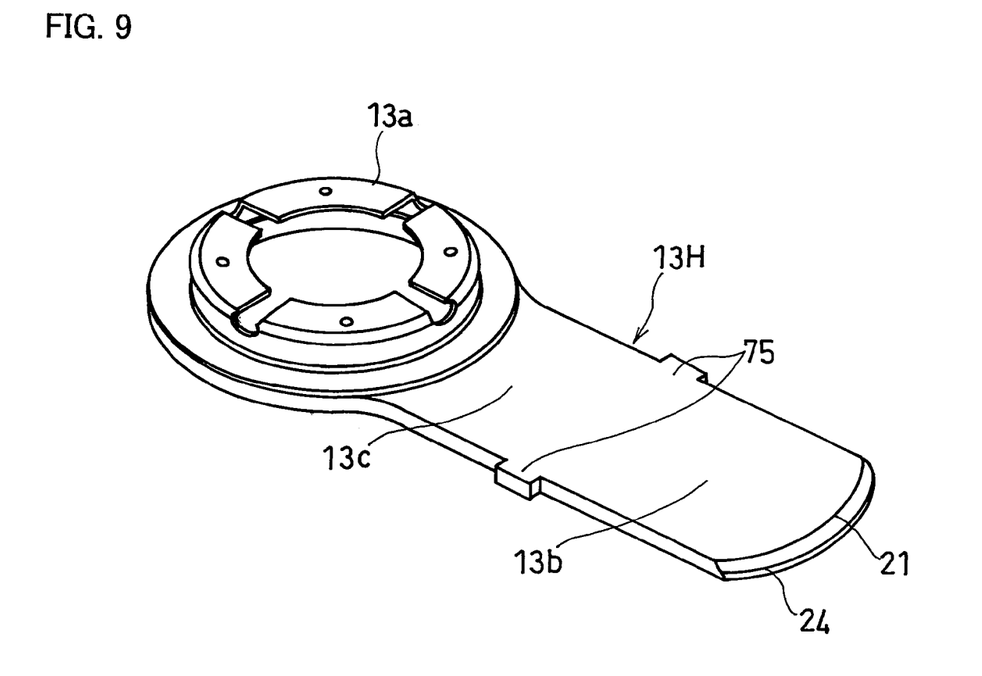
FIG. 9 is a perspective view of a bus bar included in a battery structure according to Embodiment 3 of the invention.

Embodiment 3 of the invention is described below. Embodiment 3 is an alteration of Embodiment 1. In the following description, only the components different from those of Embodiment 1 are described, and the same components as those of Embodiment 1 are given the same reference characters with their description omitted. FIG. 9 is a perspective view of a bus bar in Embodiment 3.

In Embodiment 3, as illustrated in FIG. 9, a bus bar 13H has a pair of rectangular protrusions 75, which is formed on both sides of the connecting portion 13b. The other configuration of the bus bar 13H is the same as that of the bus bar 13 of Embodiment 1.

Due to the formation of the protrusions on the side faces of the connecting portion 13b, when the connecting portion 13b is inserted into a predetermined position of the socket 17, the protrusions 75 abut against one opening edge of the socket 17. Hence, the connecting portion 13b is kept from being inserted into the socket 17 any further. Therefore, the insertion depth in inserting the connecting portion 13b into the socket 17 is defined.

As a result, the length of the part of the connecting portion 13b inserted into the socket 17 can be readily stabilized. Further, in inserting the connecting portion 13b into the socket 17H, the contact area of the connecting portion 13b and the outer edge covering portion 23 of the outer insulating tube 19B is kept constant. It is thus possible to reduce the danger of tear of the outer edge covering portion 23 due to the rubbing of the outer edge covering portion 23 of the outer insulating tube 19B against the connecting portion 13b. Also, since the depth of insertion of the connecting portion 13b into the socket 17 is stabilized, the distance between the batteries of the battery structure can be easily fixed. Hence, it is also possible to improve the dimensional accuracy of the battery structure.

Of course, the protrusions 75 can be formed on the bus bar 13G of Embodiment 2 illustrated in FIG. 6.

In Embodiment 3, the socket 17 has been described as having a prismatic shape, but this is not to be construed as limiting. The invention can be advantageously applied to the structure as illustrated in FIG. 11 and FIG. 12 in which the socket is composed of two sectionally L-shaped holders 108. In this case, by providing the side faces of the connecting portion 13b with the protrusions 75, the insertion depth in inserting the connecting portion 13b into the socket 17 is defined. As a result, the contact area of the connecting portion 13b and the outer edge covering portion 23 of the outer insulating tube 19B is kept constant. It is thus possible to reduce the danger of tear of the outer edge covering portion 23 due to the rubbing of the outer edge covering portion 23 of the outer insulating tube 19B against the connecting portion 13b.

Embodiment 4

Figure 10:
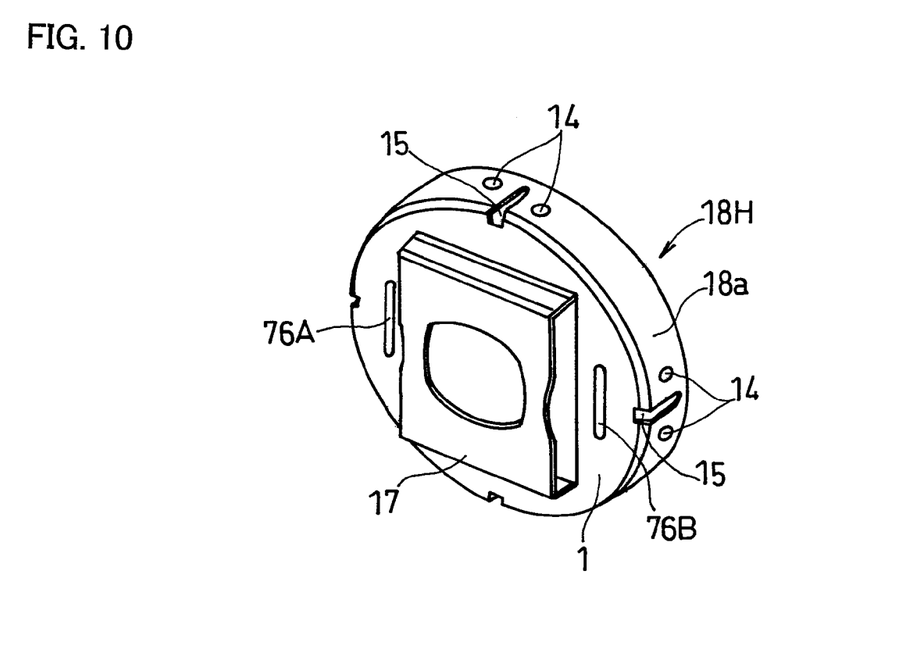
FIG. 10 is a perspective view of a negative terminal connector included in a battery structure according to Embodiment 4 of the invention.

Embodiment 4 of the invention is described below. Embodiment 4 is an alteration of Embodiment 1. In the following description, only the components different from those of Embodiment 1 are described, and the same components as those of Embodiment 1 are given the same reference characters with their description omitted. FIG. 10 is a perspective view of a negative terminal connector in Embodiment 4.

In Embodiment 4, as illustrated in FIG. 10, a negative terminal connector 18H has a front protrusion 76A and a rear protrusion 76B, which are formed in front of and behind the socket 17 of the negative terminal connector 18H in the insertion direction.

The front protrusion 76A is positioned on the outer face of the flat plate 18b of the negative terminal connector 18H so that it is to come into contact with the connecting portion 13b of the bus bar 13 (or the step 22 of the bus bar 13G) upon insertion into the socket 17H. Thus, when the connecting portion 13b is inserted into the socket 17, the connecting portion 13*b* is kept clear of the outer face of the flat plate 18*b*. Hence, the friction is reduced and the connecting portion 13*b* can be smoothly inserted into the socket 17 without requiring extra force. It is therefore possible to prevent the outer insulating tube 19B from tearing in a more reliable manner. Also, the insertion of the connecting portion 13*b* into the socket 17 is facilitated.

In addition, the rear protrusion 76B is also provided behind the socket 17 of the negative terminal connector 18H in the insertion direction. It is thus possible to prevent the tip 24 of the connecting portion 13*b* inserted into the socket 17 from being rubbed against the outer edge covering portion 23 of the outer insulating tube 19B. This permits even more reliable prevention of tear of the outer insulating tube 19B.

The front protrusion 76A and the rear protrusion 76B can be in the shape of dots, an oval, etc., as well as the linear shape as illustrated in the figure.

In Embodiment 4, the socket 17 has been described as having a prismatic shape, but this is not to be construed as limiting. The invention can be advantageously applied to the structure as illustrated in FIG. 11 and FIG. 12 in which the socket is composed of two sectionally L-shaped holders 108. In this case, by forming the front protrusion 76A or the rear protrusion 76B on at least in front of or behind the socket 17 of the negative terminal connector 18H in the insertion direction, it is possible, for the above-described reason, to reduce the danger of tear of the outer edge covering portion 23 due to the rubbing of the connecting portion 13*b* against the outer edge covering portion 23 of the outer insulating tube 19B.

EXAMPLES

Referring to drawings, Examples of the invention are described below. The following Examples are examples illustrative of embodiments of the invention, and the invention is not to be construed as being limited only to the following Examples.

Example 1

A 1.0 mm thick positive electrode plate 61 made of a sintered nickel electrode and a 0.70 mm thick negative electrode plate 62 made of a paste type cadmium electrode were spirally wound with a separator 66 interposed therebetween, to form a 50.8 mm high electrode plate assembly 65. At this time, the exposed part of a positive electrode core member 63 protruded 1.5 mm upward, and the exposed part of a negative electrode core member 64 protruded 1.5 mm downward.

Also, an upper current collector 70 was formed from a low-carbon steel plate with a thickness of 0.30 mm and an outer diameter of 30 mm. To this was welded a low-carbon steel connection lead 68 with a width of 13.0 mm and a thickness of 0.4 mm.

The upper current collector 70 has, on the lower face, a connecting portion (not shown) which was formed by a burring process so as to protrude downward. The connecting portion was welded to the end portion of the positive electrode core member 63 protruding upward from the electrode assembly 65. Likewise, a connecting portion 73 of a lower current collector 71 with a thickness of 0.30 mm and an outer diameter of 30.0 mm was welded to the end portion of the negative electrode core member 64 protruding downward from the electrode plate assembly 65.

The electrode plate assembly 65 with the upper current collector 70 and the lower current collector 71 welded thereto was inserted into a battery case 67 with an outer diameter of 32.2 mm and a thickness of 0.52 mm. The lower current collector 71 was resistance welded to the inner face of bottom of the battery case 67. A seal member 69 with an outer diameter of 31.0 mm and a thickness of 0.90 mm was resistance welded to one end of the connection lead 68 welded to the upper current collector 70.

A resin insulating ring 74 with an outer diameter of 30.77 mm was fitted to the upper circumference of the upper current collector 70 to prevent an internal short-circuit between the upper current collector 70 and the battery case 67. A recess 67*a* was formed near the opening of the battery case 67 to secure the electrode plate assembly 65 in the battery case 67.

A predetermined amount of an alkaline electrolyte was injected into the battery case 67 from a hole 70*a* of the upper current collector 70. With the connection lead 68 folded, the seal member 69 was mounted on the wall of the battery case 67 defining the recess 67*a*. The open edge of the battery case 67 was crimped inward for sealing, to produce a cylindrical alkaline storage battery (battery) as illustrated in FIG. 5.

This battery had a diameter of 32.2 mm, a height of 60.5 mm, and a nominal capacity of 5300 mAh.

Next, a battery 10A was inserted into an outer insulating tube 19A with a flat width of 60 mm and a thickness of 0.15 mm made of a PVC (polyvinyl chloride) material. The outer insulating tube 19A was caused to shrink due to heat by supplying hot air of approximately 120° C., to cover the battery 10A.

A bus bar 13 made of a nickel-plated iron material was prepared. The bus bar 13 had a total length of 70 mm, and a middle portion 13*b* thereof had a thickness of 1.8 mm and a width of 19.8 mm, and a welded portion 13*a* thereof had a thickness of 0.4 mm. The welded portion 13*a* was resistance welded to the seal member 11 of the battery 10A, to form a battery 20A with the bus bar.

Also, a cylindrical portion 18*a* of a negative terminal connector 18 was fitted to an outer face 10*c* of the battery case bottom of another battery 10B. Welding spots 14 on the side wall of the negative terminal connector 18 were resistance welded to bring the flanged component 18 into contact with the negative terminal of the battery 10B. The negative terminal connector 18 had a diameter of 33.2 mm, a height of 6.5 mm, and a thickness of 0.4 mm. A sectionally prismatic socket 17 having a width of 17 mm, a length of 21.5 mm, a total height of 2.5 mm, and a thickness of 0.4 mm was formed on the upper face of a flat plate 18*b* of the negative terminal connector 18 by a pressing process. The material of the negative terminal connector 18 was an iron material plated with nickel.

The battery 10B with the negative terminal connector 18 welded thereto was inserted into an outer insulating tube 19B with a flat width of 60 mm and a thickness of 0.15 mm made of a PVC (polyvinyl chloride) material. The outer insulating tube 19B was caused to shrink due to heat by supplying hot air of approximately 120° C. to cover the battery 10B and the negative terminal connector 18, thereby forming a battery 20B with the negative terminal connector.

The connecting portion 13*b* of the bus bar 13 of the battery 20A with the bus bar was inserted into the socket 17 of the negative terminal connector 18 of the battery 20B with the negative terminal connector. The connecting portion 13*b* was resistance welded to the socket 17 of the negative terminal connector 18 at welding spots 23 to produce a battery structure 10. This battery structure 10 is designated as Example 1.

The bus bar 13 had the same structure as the bus bar 13 of Embodiment 1 illustrated in FIG. 3 and FIG. 4. A tip 24 of the connecting portion 13b was in the shape of a semicircle with a radius of 15 mm, and the tip 24 was provided with a chamfer 21 of 1.4 mm.

Example 2

A battery structure was produced in the same manner as in Example 1, except that the connecting portion 13b of the bus bar 13G illustrated in FIGS. 6 and 7 was subjected to an extruding process (or pressing process) to form a step 22 with a height of 1 mm, and that the total height of the socket 17G of the negative terminal connector 18G was set to 3.5 mm. This battery structure is designated as Example 2.

Example 3

A battery structure was produced in the same manner as in Example 1, except that the connecting portion 13b of the bus bar 13 illustrated in FIG. 9 was provided with two protrusions 75, one on each side, having a width of 2 mm and a protruding length of 0.8 mm. This battery structure is designated as Example 3.

Example 4

A battery structure was produced in the same manner as in Example 3, except that the outer face of the flat plate 18b of the negative terminal connector 18H illustrated in FIG. 10 was provided with linear protrusions 76A and 76B with a length of 7.3 mm, a width of 2.5 mm, and a height of 0.5 mm in front of and behind the socket 17 in the insertion direction, and that the total internal height of the socket 17 was set to 3.0 mm. The battery structure produced is designated as Example 4.

Example 5

A battery structure was produced in the same manner as in Example 3, except that the outer face of the flat plate 18b of the negative terminal connector 18H illustrated in FIG. 10 was provided with a socket composed of a pair of sectionally L-shaped holders (see FIGS. 11 and 12), that linear protrusions 76A and 76B with a length of 7.3 mm, a width of 2.5 mm, and a height of 0.5 mm were provided in front of and behind the socket in the insertion direction, and that the total internal height of the socket was set to 3.0 mm. The battery structure produced is designated as Example 5.

Comparative Example 1

A battery structure was produced in the same manner as in Example 1, except for the use of the conventional bus bar 103 and the conventional negative terminal connector 104 with the L-shaped holders 108 illustrated in FIG. 11 and FIG. 12. The battery structure produced is designated as Comparative Example 1.

Fifty battery structures of each of Examples 1 to 5 and Comparative Example 1 were produced. At this time, the greatest possible attention was given so that the tip 24 of the connecting portion 13b was rubbed against the outer edge covering portion 23 of the outer insulating tube 19B. The presence or absence of tear of the outer edge covering portion 23 was checked. The results are shown in Table 1.

TABLE 1

| | Bus bar | | Negative terminal connector | | |
| --- | --- | --- | --- | --- | --- |
| | Tip shape of connecting portion | Shape or feature of area of connecting portion to come into contact with socket | Shape of socket | Shape of outer face of flat plate | Presence or absence of tear of outer insulating tube |
| Example 1 | Chamfered | Flat | Prismatic | Flat | No tear (0/50) |
| Example 2 | Chamfered | With a step | Prismatic | Flat | No tear (0/50) |
| Example 3 | Chamfered | Flat with protrusions on both sides | Prismatic | Flat | No tear (0/50) |
| Example 4 | Chamfered | Flat with protrusions on both sides | Prismatic | With linear protrusions | No tear (0/50) |
| Example 5 | Chamfered | Flat with protrusions on both sides | L-shaped by slitting and pressing | With linear protrusions | No tear (0/50) |
| Comp. Example 1 | Not chamfered | Flat | L-shaped by slitting and pressing | Flat | Torn (2/50) |

As shown in Table 1, in Examples 1 to 5, none of the outer insulating tubes 19A and 19B had a tear. Contrary to this, in Comparative Example 1, in 2 battery structures out of 50, the outer edge covering portion 23 of the outer insulating tube 19B was torn.

This is probably because the edge of the tip 120 of the connecting portion 103a of the bus bar 103 of Comparative Example 1 was sharp without being chamfered.

Also, in Example 2, when the connecting portion 13b of the bus bar 13 of the battery 20A with the bus bar was inserted into the socket of the negative terminal connector 18 of the battery 20B with the negative terminal connector, the connecting portion 13b could be inserted more smoothly than in Example 1, Example 3, and Comparative Example 1.

This is probably because in Example 2, the step 22 formed on the connecting portion 13b of the bus bar 13G decreased the contact area between the bus bar 13G and the negative terminal connector 18 and the outer edge covering portion 23 of the outer insulating tube 19B, thereby reducing the friction resistance between the respective components.

Also, in Example 3, the protrusions 75 are formed on both sides of the bus bar 13H. Thus, the depth of insertion of the connecting portion 13b of the bus bar 13H into the socket 17 became constant, and the connecting portion 13b inserted into the socket 17 could be easily secured at that position. As a result, the area of the bus bar 13 and the outer edge covering portion 23 rubbed against each other can be made constant and minimum. Probably for this reason, it is possible to reduce the danger of tear of the outer insulating tube 19B due to the rubbing of the outer edge covering portion 23 of the outer insulating tube 19B against the connecting portion 13b of the bus bar 13H.

Also, in Example 4, in the same manner as in Example 2, when the connecting portion 13b of the bus bar 13 was inserted into the socket 17 of the negative terminal connector 18, it could be inserted more smoothly than in Example 1, Example 3, and Comparative Example 1. This is probably because the linear protrusions 76A and 76B formed on the areas of the flat plate 18b of the negative terminal connector 18 to come into contact with the connecting portion 13b of the bus bar 13 decreased the contact area of the bus bar 13 and the negative terminal connector 18, thereby reducing the friction resistance between the respective components. As a result, the insertion of the connecting portion 13b into the socket 17 is stabilized. Also, in Example 4, due to the provision of the protrusions 75, the depth of insertion of the connecting portion 13b into the socket 17 could be made constant in the same manner as in Example 3.

Also, in Example 5, in the same manner as in Example 4, when the connecting portion 13b of the bus bar 13 was inserted into the socket of the negative terminal connector, it could be inserted more smoothly than in Example 1, Example 3, and Comparative Example 1.

In Examples 4 and 5, the linear protrusions 76A and 76B were formed. However, it has been confirmed that the use of protrusions in the shape of dots or an oval can also produce essentially the same effect.

INDUSTRIAL APPLICABILITY

The battery structure of the invention is useful as the power source for electric assist bicycles, motorcycles, electric vehicles, etc, which require safety and large-current discharge characteristics.

The invention claimed is:

1. A battery structure comprising:
at least two batteries disposed axially parallel to each other, positive terminals thereof facing opposite directions, negative terminals thereof facing opposite directions;
an insulating material covering each of the batteries; and
a connecting member provided at an end of the at least two batteries for connecting the positive terminal of one of the batteries with the negative terminal of the other battery,
wherein the connecting member includes:
a negative terminal connector attached to the other battery so as to come into contact with the negative terminal of the other battery; and
a bus bar connected at one end portion thereof to the positive terminal of said one battery,
the negative terminal connector includes:
a cylindrical portion fitting to the end portion of the other battery on the negative terminal side; and
a flat plate facing the bottom of the other battery on the negative terminal side, and the flat plate has a socket into which the other end portion of the bus bar is to be inserted in a direction perpendicular to an axial direction of the other battery,
the tip of the other end portion of the bus bar in the direction of insertion into the socket is chamfered, and
the other end portion of the bus bar has a step that protrudes toward the flat late when the other end portion is inserted into the socket.

2. The battery structure in accordance with claim 1, wherein the socket of the negative terminal connector is prismatic.

3. A battery structure comprising:
at least two batteries disposed axially parallel to each other, positive terminals thereof facing opposite directions, negative terminals thereof facing opposite directions;
an insulating material covering each of the batteries; and
a connecting member provided at an end of the at least two batteries for connecting the positive terminal of one of the batteries with the negative terminal of the other battery, wherein:
the connecting member includes:
a negative terminal connector attached to the other battery so as to come into contact with the negative terminal of the other battery; and
a bus bar connected at one end portion thereof to the positive terminal of said one battery,
the negative terminal connector includes:
a cylindrical portion fitting to the end portion of the other battery on the negative terminal side; and
a flat plate facing the bottom of the other battery on the negative terminal side, and the flat plate has a socket into which the other end portion of the bus bar is to be inserted in a direction perpendicular to an axial direction of the other battery,
the tip of the other end portion of the bus bar in the direction of insertion into the socket is chamfered, and
the flat plate of the negative terminal connector has a protrusion to come into contact with the other end portion of the bus bar upon insertion into the socket, and the protrusion is provided at least in front of or behind the socket in the insertion direction.

4. The battery structure in accordance with claim 3, wherein the protrusion is in the shape of a line, dots, or an oval.

5. The battery structure in accordance with claim 1, wherein the other end portion of the bus bar has an insertion-depth defining protrusion to abut against an opening edge of the socket to define the depth of insertion into the socket.

6. The battery structure in accordance with claim 3, wherein the socket of the negative terminal connector is prismatic.

7. The battery structure in accordance with claim 3, wherein the other end portion of the bus bar has an insertion-depth defining protrusion to abut against an opening edge of the socket to define the depth of insertion into the socket.

* * * * *